(12) United States Patent
Ion

(10) Patent No.: US 8,529,183 B2
(45) Date of Patent: Sep. 10, 2013

(54) VEHICLE RESTRAINT SYSTEM

(75) Inventor: Grigore Ion, Richmond Hill (CA)

(73) Assignee: Blue Giant Equipment Corporation, Ontario (CA)

(*) Notice: Subject to any disclaimer, the term of this patent is extended or adjusted under 35 U.S.C. 154(b) by 202 days.

(21) Appl. No.: 12/760,248

(22) Filed: Apr. 14, 2010

(65) Prior Publication Data

US 2010/0266375 A1    Oct. 21, 2010

Related U.S. Application Data

(60) Provisional application No. 61/170,417, filed on Apr. 17, 2009.

(51) Int. Cl.
*B65F 9/00* (2006.01)

(52) U.S. Cl.
USPC ............ 414/401; 414/396; 414/402; 414/809

(58) Field of Classification Search
USPC .......................... 414/396, 401, 402, 584, 809
See application file for complete search history.

(56) References Cited

U.S. PATENT DOCUMENTS

| | | | |
|---|---|---|---|
| 4,400,127 A | 8/1983 | Metz |
| 4,555,211 A | 11/1985 | Metz |
| 4,887,954 A | 12/1989 | Gregorson et al. |
| 4,988,254 A | 1/1991 | Alexander |
| 5,026,242 A | 6/1991 | Alexander |
| 5,071,306 A | 12/1991 | Alexander |
| 6,439,823 B1 | 8/2002 | Lambert |
| 6,488,464 B1 | 12/2002 | Kish |

*Primary Examiner* — Saul Rodriguez
*Assistant Examiner* — Willie Berry, Jr.
(74) *Attorney, Agent, or Firm* — Hovey Williams LLP

(57) ABSTRACT

The invention relates to a system for restraining a vehicle at a loading dock, having a base, an arm rotatably mounted to the base for rotating between a lowered position out of contact with the vehicle, a partially elevated position and an upright position for contacting the vehicle to restrain the vehicle in a position suitable for loading or unloading, an arm rotator, a position sensor to detect the rotational position of the arm, a lock and a lock actuator for locking the arm, and a controller in operative communication with the position sensor for determining the position of the vehicle relative to the dock upon contact between the arm and the vehicle for actuating the lock to retain the arm in the upright position to restrain the vehicle.

20 Claims, 7 Drawing Sheets

SECTION A-A

VEHICLE RESTRAINT SYSTEM

CROSS-REFERENCE TO RELATED APPLICATIONS

This application claims the benefit of U.S. Application No. 61/170,417, filed on Apr. 17, 2009, which is incorporated herein by reference.

FIELD OF THE INVENTION

The invention relates to stationary mechanical devices for the safe loading and unloading of vehicles at loading docks, in particular a mechanical vehicle restraint to restrain vehicles during the loading and unloading process, which operates by extending a member to contact a portion of the vehicle to prevent movement of the vehicle.

BACKGROUND OF THE INVENTION

The loading and unloading of large vehicles such as trucks from a loading dock requires that the vehicle be stabilized so as to prevent the vehicle from accidentally rolling away from the loading platform. This can occur, for example, if the driver neglects to sufficiently engage the vehicle brakes, if the brakes fail, or even if the driver inadvertently attempts to drive the vehicle away from the dock prematurely. This can have serious safety and equipment consequences, in that a forklift or other equipment may fall within the gap, or loading dock or other equipment may be damaged. There also may exist regulatory requirements that vehicles be restrained by mechanical means during the loading and unloading process.

A simple method of restraining a vehicle is the use of wheel chocks. However, these rely on consistent operator usage. It is difficult to provide a simple, reliable and practical means to ensure that the chocks have been correctly placed, resulting in the possibility that the dock or truck operator may incorrectly believe that the vehicle has been restrained, when in fact it has not. In response to this drawback, there have been developed various mechanical vehicle restraints which can be permanently affixed to or near the loading dock. Such restraints typically include an arm or other restraining member which moves into a restraining position to engage a portion of the vehicle when the vehicle is properly positioned and parked, and then moves away from engagement with the vehicle to permit the vehicle to depart and a new vehicle to be positioned in its place. Such restraints can be highly effective and less prone to error than wheel chocks. However, existing systems tend to suffer from drawbacks including complexity and cost and the use of components which are not sufficiently robust to withstand the environment of a typical loading dock.

These and other aspects of the prior art are addressed in the present invention.

SUMMARY OF THE INVENTION

According to one aspect, the invention relates to a vehicle restraint system for preventing a vehicle such as a tractor trailer from inadvertently rolling away from a loading dock. In one aspect, the system comprises the following components a) a base;
b) an arm rotatably mounted to said base for rotating between a lowered position out of contact with said vehicle, a partially elevated position comprising a predetermined range, and an upright position wherein said arm may contact said vehicle to restrain said vehicle in a position suitable for loading or unloading;
c) an arm rotator for rotating said arm between said lowered and upright positions;
d) a contact sensor for detecting contact between said arm and said vehicle;
e) a position sensor to detect the rotational position of said arm;
f) a lock; and
g) a lock actuator in operative communication with and responsive to the contact sensor and position sensor for actuating said lock to retain said arm when in said upright position and in contact with said vehicle.

Preferably, the system includes a user interface configured to permit control of said system and to provide the user with information relating to at least whether said vehicle is restrained or unrestrained and a controller in operative contact with said actuator, said anti-rotation means, said contact sensing means, said position sensor and said user interface. The controller is configured for operation of said system according to the following sequence:

(a) rotate said arm from said lowered position towards said upright position in response to a signal from said user interface;

(b) upon detection by said contact sensor of contact with said vehicle at a rotational position of said arm which is within the predetermined angular range indicative of the arm being partially elevated, rotate said arm back to said lowered position and signal to said user interface that the vehicle is unrestrained; and (c) upon said arm reaching said upright position without the contact sensor detecting contact between the arm and the vehicle, or upon detecting contact when at this position, engage the lock and signal to said user interface that said vehicle is restrained. Optionally, a further step of the sequence comprises:

(d) upon detection by said position sensor that said arm is at a rotational position beyond said predetermined range, which is indicative of the arm having rotated past the predetermined range without contacting a vehicle, rotate said arm back to said lowered position and signal said user interface that said vehicle is unrestrained.

The controller may comprise any suitable system for operation of the components of the vehicle restraint by carrying out the above steps. It is contemplated that the controller includes a programmable integrated circuit or an all-purpose computer programmed to carry out the above steps. However, the control system is not limited to such means, and includes any suitable means or system which is responsive to inputs from the system and is configured to control the anti-rotation means and arm actuator in response to said inputs. The signal transmissions and actuation means between the controller and the components may also comprise any suitable means, whether wireless or wired electrical signals, mechanic means, or otherwise. The controller may include or be in communication with a source of hydraulic fluid to control operation of various hydraulic components of the system. Alternatively, some or all of the system may be driven by electromechanical means in communication with the controller.

The position sensor is broadly defined and may without limitation comprise an angle detector mounted to said arm configured to detect the angle of disposition of said arm and to transmit a signal to said controller indicative of said angle of disposition.

The contact sensor is broadly defined and includes without limitation a sensor mounted to the arm or a means associated with said arm actuator to determine excess resistance being applied to the thereto, which is indicative of contact of the arm with a vehicle. The contact sensor may also consist of a feedback system linked to the position sensor. According to this aspect, rotation of the arm is halted by contact with the vehicle, and the cessation of movement of the arm is detected by the position sensor. The controller is responsive to signals from the position sensor, and upon is configured to equate cessation of movement of the arm as contact with the vehicle, and initiate the above steps (b), (c) or (d) in response thereto, depending on the rotational position of the arm upon being stopped by contact with the vehicle. Other contact sensors or sensing means are known per se and may be adapted for use in the present invention.

The lock component of the system is broadly defined any includes any suitable means to prevent movement of the arm when engaged with the vehicle. For example, the lock may comprise a mechanical lock, which may include a moveable member having an engagement surface, configured to contact a cooperating surface on the arm when the moveable member is positioned in a locking mode, and to disengage the surface when positioned in a non-locking mode. Persons skilled in the art will understand that other types of anti-rotation means may be implemented to prevent movement of the arm when the arm is in the upright position for restraining the vehicle.

According to another aspect, the invention relates to a vehicle restraint having a mechanical lock to selectively retain the arm in an upright position to restrain a vehicle. Preferably, the vehicle restraint is as described above. In one aspect, the lock includes a shaft rotatably mounted to the base of the restraint. The shaft and the arm of the vehicle restraint have mutually engaging contact surfaces such that when the arm is in an upright position and the shaft is rotated such that it is oriented in a locking position, the respective contact surfaces are in contact with each other to retain said arm in said elevated position. In this position, the arm is blocked from moving rearwardly away from the loading dock. If the arm is in contact with the vehicle when thus locked, the arm restrains the vehicle from moving away from the dock. When the shaft of the lock is rotated into an unlocking position, the contact surface of said shaft is positioned away from the arm to permit free rotation of said arm, such that the arm can be lowered in the rearward direction (away from the dock) to permit the vehicle to depart from the dock.

In a preferred aspect, the shaft is journalled to said base for rotation about a horizontal axis, and said mutually engaging contact surfaces are curved. In particular, the contact surface of the arm may be concave, and configured for contact with the cylindrical wall of the shaft. The shaft may include a recessed portion that when rotated into the unlocking position, permits the arm to swing freely past the shaft. The shaft may be rotated by an actuator, such as a hydraulic ram. Preferably, the contact surface of the arm is located on one or more ribs protruding outwardly from the arm.

According to another aspect, the invention relates to a method to restrain a vehicle, comprising the steps of:

(a) rotating the arm from its lowered, inoperative position, towards the upright position, until the arm contacts a portion of the vehicle;

(b) detecting the angular disposition of the arm at the point of contact; if this angle is below the selected range, retracting the arm back to its lowered position and signalling the operator that the vehicle is unrestrained;

(c) if the arm is within the selected range at the point of contact, engaging the anti-rotation means to retain the arm in its upright position, and signalling to the operator that the vehicle is restrained;

(d) if the arm travels past the range without contacting the vehicle, returning the arm to its lowered position and signalling to the user that the vehicle is unrestrained.

Preferably, the upright position for engagement with the vehicle is substantially vertical, and the predetermined range consists of a range between said upright position and a position past said upright position.

Preferably, the step of determining the angular position of said arm comprises providing an angle detector mounted to said arm to detecting the angle of said arm and to transmit a signal to said controller indicative of said angle of disposition.

The steps of determining contact between said arm and said vehicle may comprise determining cessation of rotational movement of said arm or resistance to rotational movement indicative of contact with a vehicle.

It is contemplated that the arm is configured to contact the ICC bar of a tractor-trailer vehicle. However, it is also contemplated that the system may be configured for contact with another convenient portion of the vehicle.

Having thus generally described the invention, the present invention will now be described by reference to detailed embodiments thereof. It will be understood that this detailed description is not intended to limit the scope of the invention. Persons skilled in the art will recognize that the invention includes within its scope elements which depart from those described herein, but which perform the same or similar function, and which otherwise operate in an equivalent fashion, or may be made to do by means known to the skilled person. It will be further understood that all numerical values including dimensions, as well as references to particular materials and the like, are presented merely by way of example and are not intended to limit the scope of the invention. Furthermore, directional references and the like used herein are merely used for ease of description and are not to be taken as limitative.

DETAILED DESCRIPTION

Figure 1:
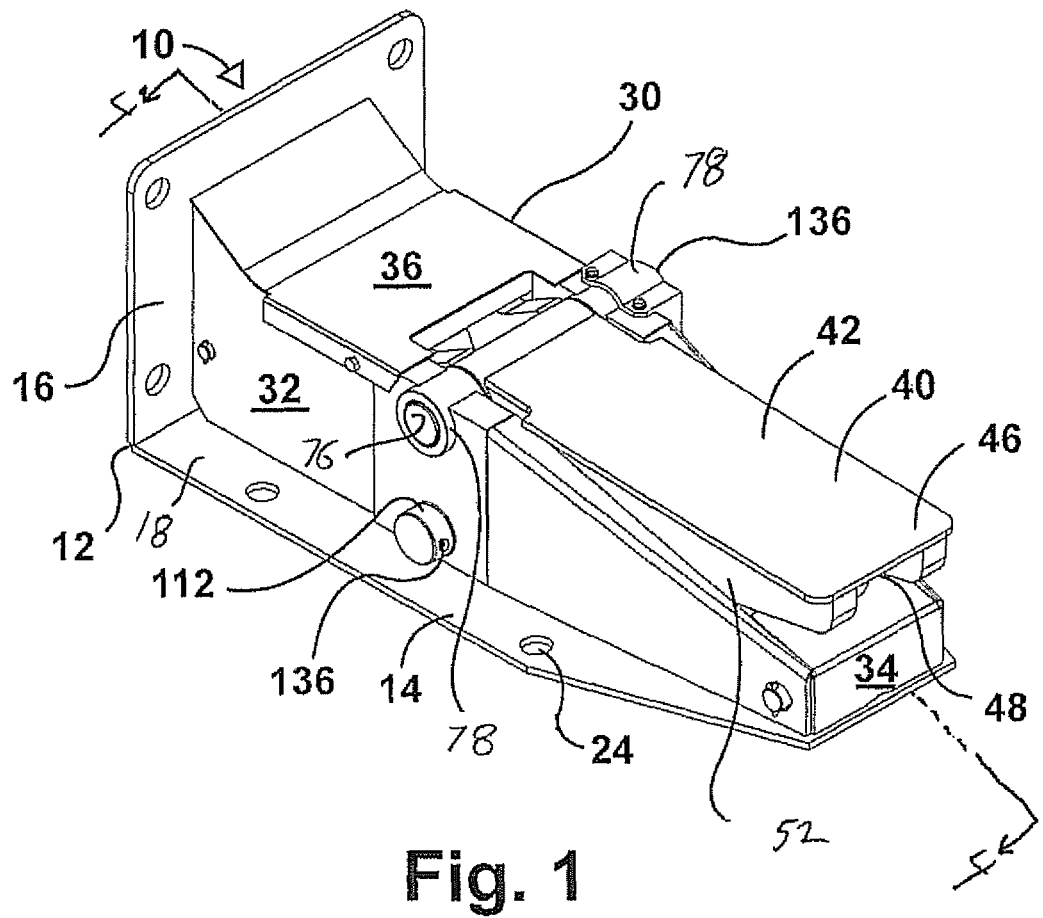
FIG. 1 is a perspective view of a vehicle restraint according to the present invention, in the lowered position.

Turning to FIGS. 1 through 5, the restraint 10 comprises a base 12 fabricated from welded heavy gauge plate steel. The base includes an L-shaped base plate 14, having a vertical portion 16 for optional mounting to the upright wall of a loading dock 20 (shown in FIG. 9), and a horizontal portion 18 for mounting to the floor 22 of the vehicle pad adjacent to the dock 20. The base plate 14 includes openings 24 for receiving suitable mounting bolts or other fasteners, not shown. The base further comprises a housing 30 comprised of heavy gauge side walls 32, an end wall 34, and an upper cover plate 36 partially enclosing the housing 30 to minimize debris from entering into the housing.

A broad paddle-shaped restraining arm 40 is rotatably mounted to the housing 30 via a rotatable mount, described below. The arm is defined by a proximal end adjacent to the rotatable mount, and a distal end opposed to the proximal end. The restraining arm comprises a flat rectangular plate 42, the upper surface of which is configured to contact a portion of a vehicle when in the upright restraining position. Specifically, as described below, arm 40 is configured to contact the ICC bar of a conventional trailer to restrain the trailer from rolling away from the dock. Arm 40 further comprises ribs 52(a) and (b) which protrude downwardly from the underside of plate 42. Ribs 52 (a) and (b) are parallel to each other and extend lengthwise along the elongate axis of the arm 40, inwardly spaced from the lateral edges of the plate 42. Ribs 52 are spaced apart to accommodate a hydraulic actuating system, described below, which fits in the space between the ribs. At their proximal ends 56, ribs 52 protrude past the proximal edge of plate 42. The lower edges 60 of the ribs 52 comprise a curved segment 62 having a radius of curvature configured to permit arm 40 to rotate freely past the rotating lock cylinder 80, described below, when in an unlock position. Upper surfaces of ribs 52 comprise scalloped recesses 64 which form engagement surfaces configured to engage the lock cylinder 80 to retain the arm 40 in an upright position, when the lock cylinder 80 is actuated for locking engagement with the ribs, as will be described below. An end plate 48 spans the space between ribs 52a and b, and is spaced inwardly from the distal edge of plate 42.

Ribs 52 a and b each include therein a horizontal opening 66 which are adjacent to the proximal ends of the ribs. The respective openings 66 are horizontally aligned with each other. Openings 66 are each reinforced with a sleeve 68, thereby forming aligned bearing surfaces to rotatably support cylindrical mount pin 70. Openings 66 cooperate with cylindrical mount pin 70, to permit arm 40 to be pivotally mounted to the base, as will be described below.

Figure 2:
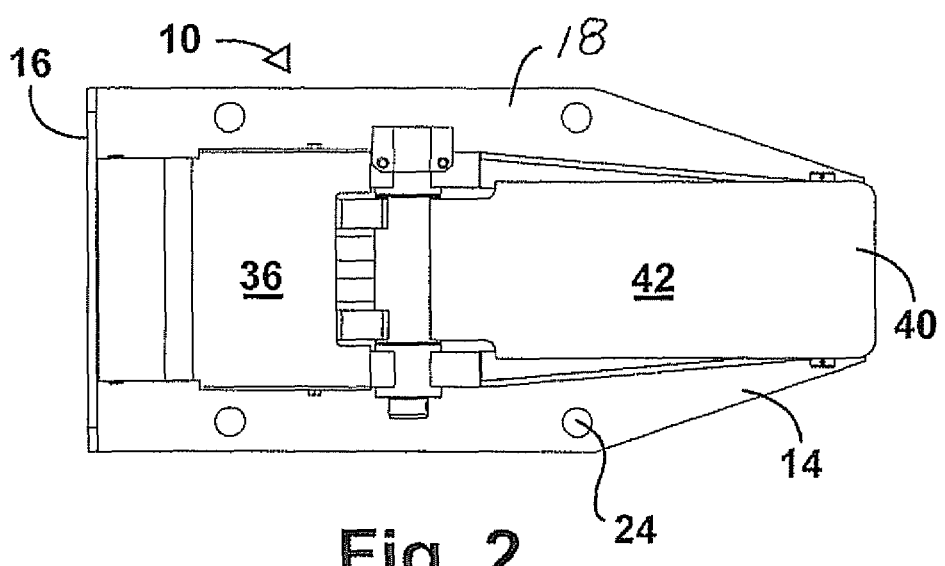
FIG. 2 is a plan view, from above, of the embodiment of FIG. 1.
Figure 4:
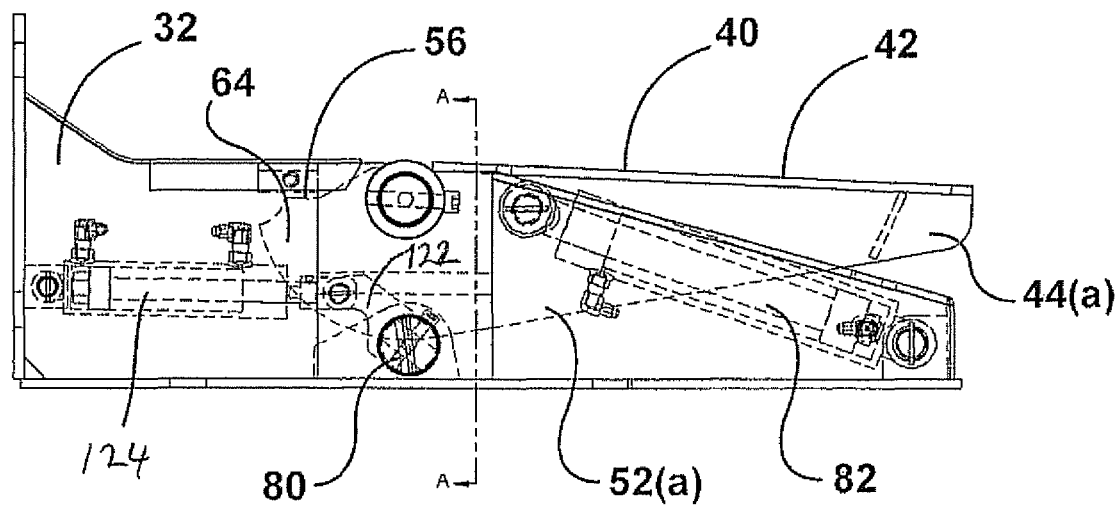
FIG. 4 is a side elevational view, in section, along long 4-4 of FIG. 1, in which the hydraulic lines have been removed to show detail.
Figure 5:
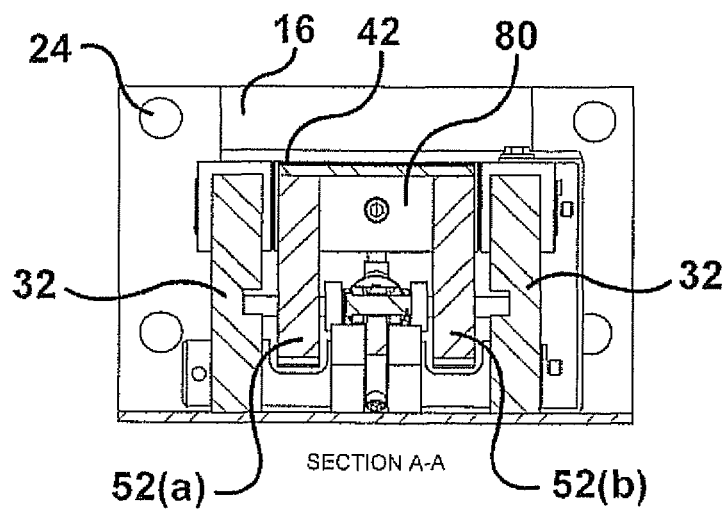
FIG. 5 is a cross-sectional view, along line A-A of FIG. 4.

The housing 30 includes horizontally aligned openings 76 within the side walls 32. Openings 76 are reinforced by sleeves 78 to form bearing surfaces aligned with openings 66 to receive rotatable pin 70. Arm 40 is rotatably mounted to the housing 30 via pin 70, which passes through openings 66 and 76. Arm 40 rotates about the axis defined by pin 70 between a lowered position as seen in FIGS. 1, 2 and 4, wherein the arm is generally horizontally disposed and can rest upon side walls 32, through a range of partially and fully elevated positions, as will be described and illustrated in more detail herein.

Rotation of arm 40 is driven by an arm rotator or actuator 82, comprising a hydraulic ram. Other rotators or actuating means which are known per se to the art may be used or adapted to the present invention. Preferably, actuator 82 is supplied with hydraulic fluid at a relatively low pressure, such as about 100 psi, such that arm 40 does not apply excessive pressure against the vehicle when contacting same. Excessive force exerted by arm 40 against the vehicle could tend to push the vehicle rearwardly, rather than allowing the arm to stop further rotation upon contact with the vehicle. The base of actuator 82 is rotatably mounted to the housing 30, by a mounting pin 86 extending through horizontally aligned openings 88 extending through the side walls 32 of the housing 30 and a hollow transverse sleeve 90 of the hydraulic cylinder. The mounting position of actuator 82 is towards the lower front corner of the housing 30. The opposed (upper) end of hydraulic actuator 82 is rotatably mounted to the arm 40, by means of a mounting pin 92 which extends through aligned apertures 94 within ribs 52. Extension of hydraulic cylinder 82 rotates the arm 40 towards the upright position, while retraction of the cylinder 82 lowers the arm 40. Preferably, the various components of the system are configured to permit a relatively low profile of the structure 10 when in the lowered position, in order to accommodate low-clearance vehicles such as air-ride tractor-trailers.

A position sensor 100 is mounted to the arm at a suitable location to permit the sensor to determine the rotational (angular) position of arm 40. The position sensor may comprise any suitable sensing means for determining the rotational position of the arm. The sensor is capable of transmitting information indicative of the position of the arm on a continuous and real-time (no delay) basis. The position sensor detects the angular position of the arm within a 180 degree arc, with 0 degrees being the fully forward position wherein the distal end of the arm points forwardly, away from the dock. The position sensor transmits an electronic signal to the control system 110, described below, indicative of the position and angular disposition of the arm. Alternatively, the position sensor may comprise means associated with actuator 82 responsive to the extension of the actuator, which is indicative of the rotational position of arm 40.

The lock component of restraint system 10 will now be described, with particular reference to FIGS. 3 through 7. The lock is configured to permit free rotation of arm 40 when in an unlocked position, but to retain the arm in a substantially vertical, upright position when locked. The lock can be adapted to lock the arm in a fixed vertical or substantially vertical position, or alternatively within a range of substantially upright positions comprising a range of angular positions which reflect the operative range within which a truck can be parked for safe loading or unloading.

The lock comprises a rotatable lock cylinder 80 extending horizontally across the housing, mounted to the housing near the base of the housing. Lock cylinder 80 is retained within cylindrical openings 112 within the side walls 32 of the housing 30, and is able to freely rotate within openings 112. Additional support for the lock cylinder is provided by a pair of mounts 114 that protrude upwardly from the base plate 18, having opening 116 therein aligned with openings 112 in the side walls. The lock cylinder 80 extends through all four of the respective aligned openings 112, 116. The lock cylinder 80 includes two recessed cutaway regions 120(a) and (b) adjacent to each end of the lock cylinder 80 and adjacent to the side walls 32. Regions 120 (a) and (b) comprise engagement surfaces which cooperate with corresponding surfaces on the ribs 52, as will be described below. A reaction arm 122 protrudes outwardly from the midpoint of cylinder 80, fitting between mounts 114. Reaction arm 122 comprises a flat elongate plate that converts a linear force applied to the reaction arm into rotation of lock cylinder 80. A hydraulic actuator 124 is rotatably mounted to reaction arm 122 to rotate the cylinder via the reaction arm 122. Actuator 124 extends lengthwise within the housing 30, with its proximal end being rotatably mounted to the vertical portion 16 of the base plate 14. Extension of actuator 124 rotates the cylinder 80 in a first direction (clockwise, when viewed in the position shown in FIGS. 3 and 4), while retraction of actuator 124 rotates lock cylinder 80 in the opposed direction.

Figure 3:
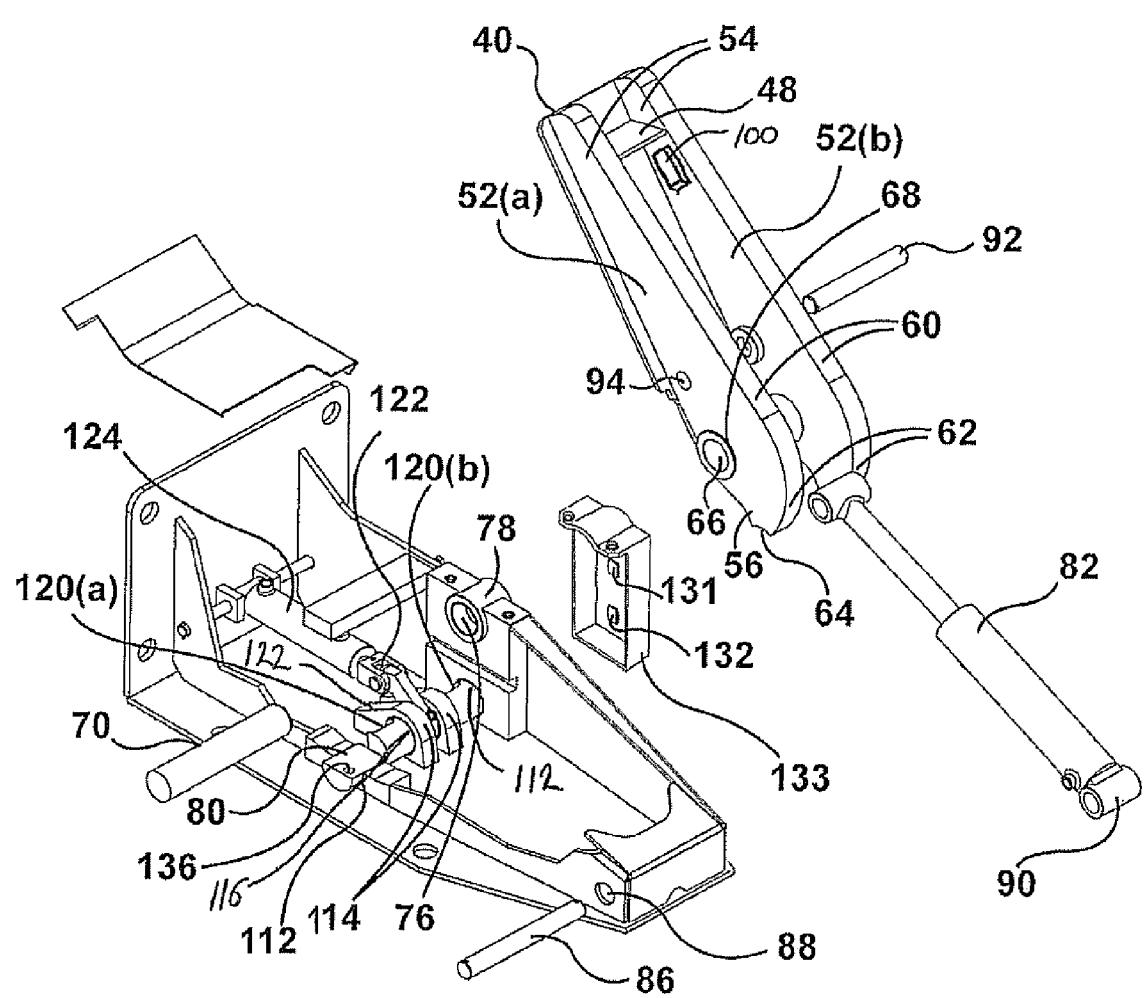
FIG. 3 is an exploded view, in perspective, showing the device rotated past its upright position, shown in a partially cut-away view for visibility of internal components.
Figures 6, 7:
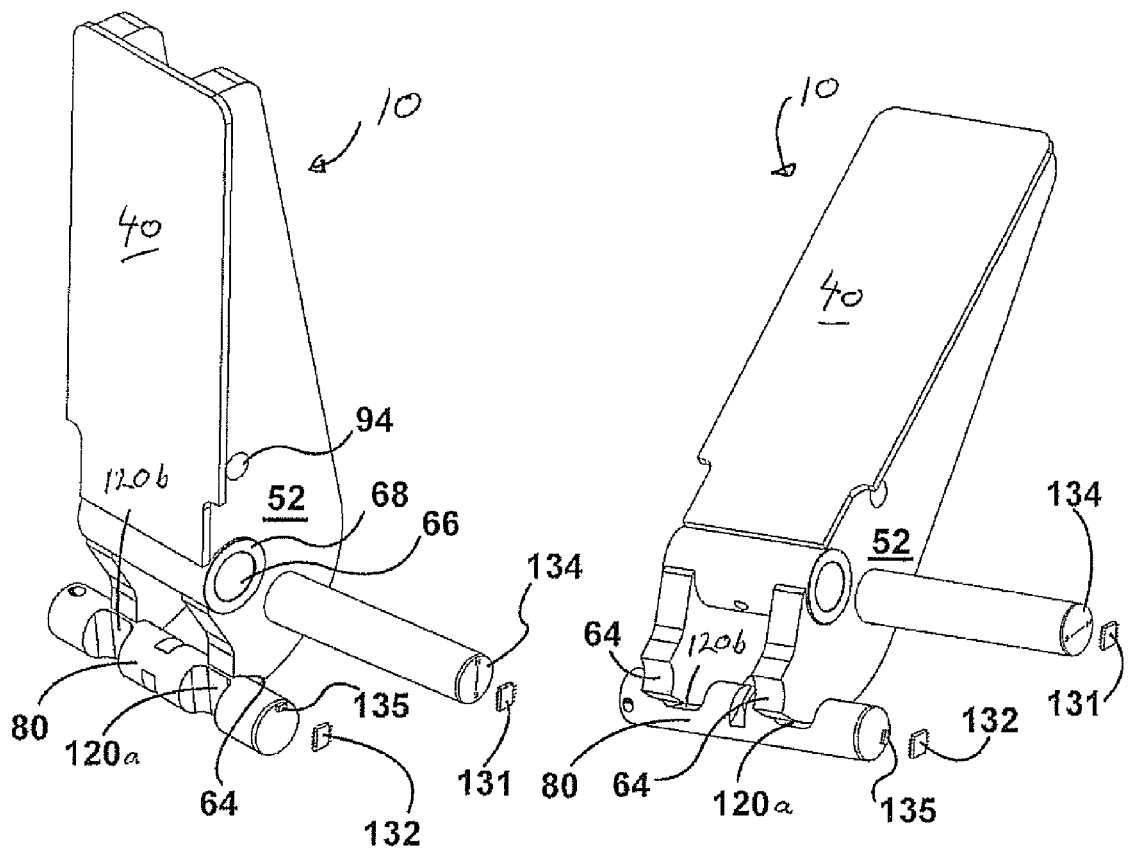
FIG. 6 is a side elevational view of a portion of the device, showing a portion of the lock mechanism, in the locked position.
FIG. 7 is a view of the portion shown in FIG. 6, in the unlocked position.
Figure 8A:
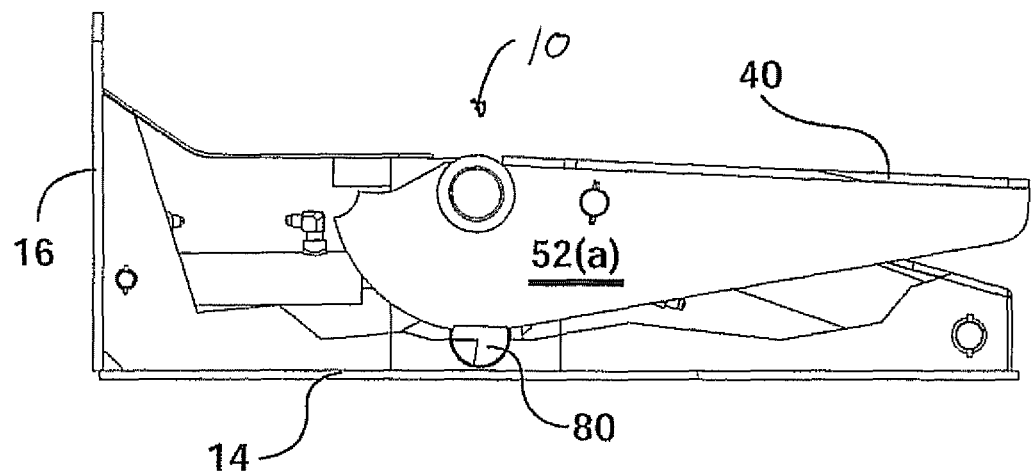
FIG. 8A is a side elevational view of the device, with the housing partially cut away to show internal structure, in the lowered (inoperative) position.
Figure 8B:
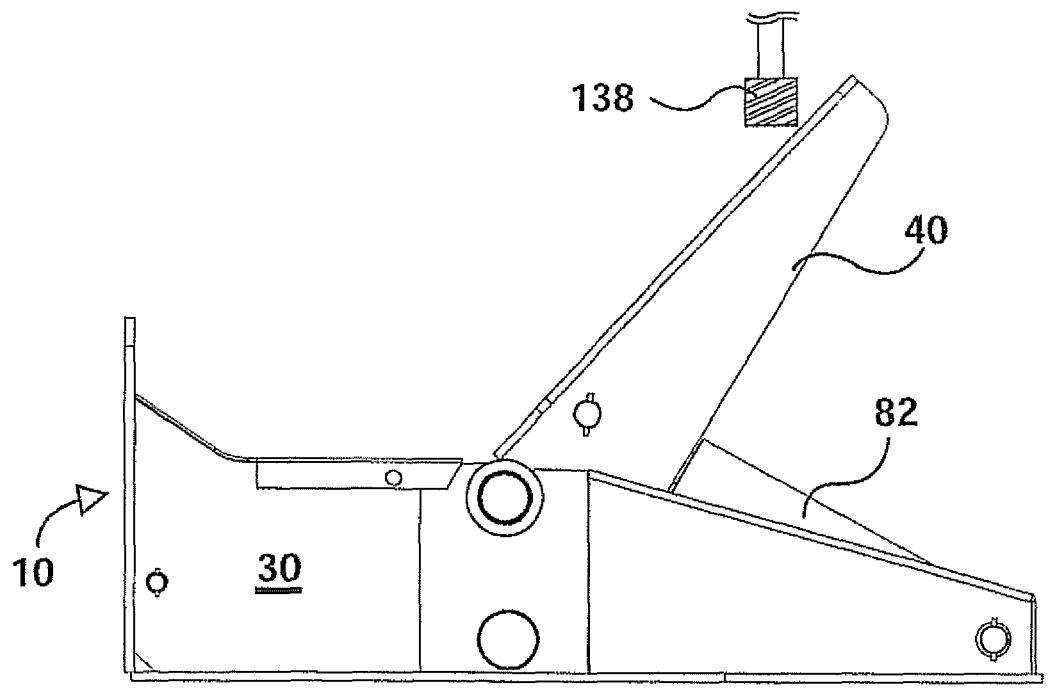
FIG. 8B is a view as in FIG. 8A, in a partially elevated position.
Figure 8C:
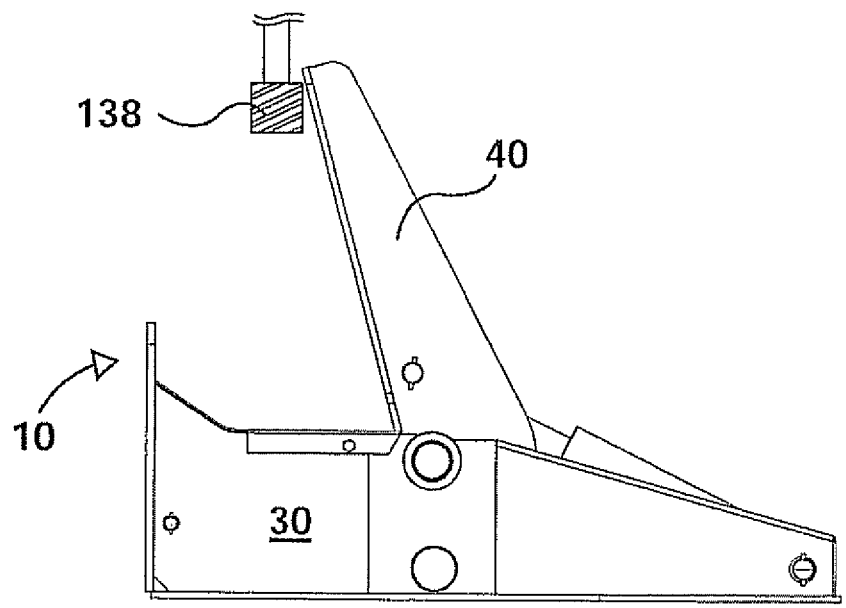
FIG. 8C shows the device in position rotated past the fully upright position, but still within the operative range.
Figure 8D:
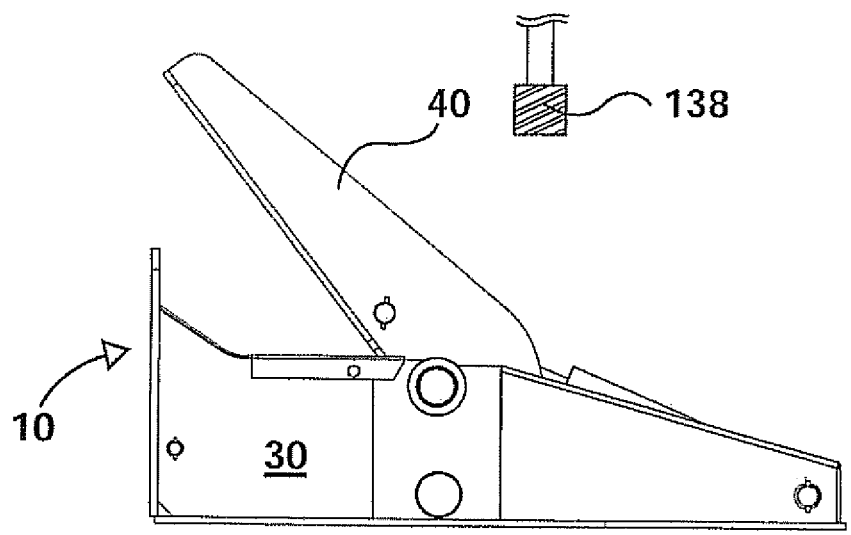
FIG. 8D shows the device rotated past the operative range.
Figure 8E:
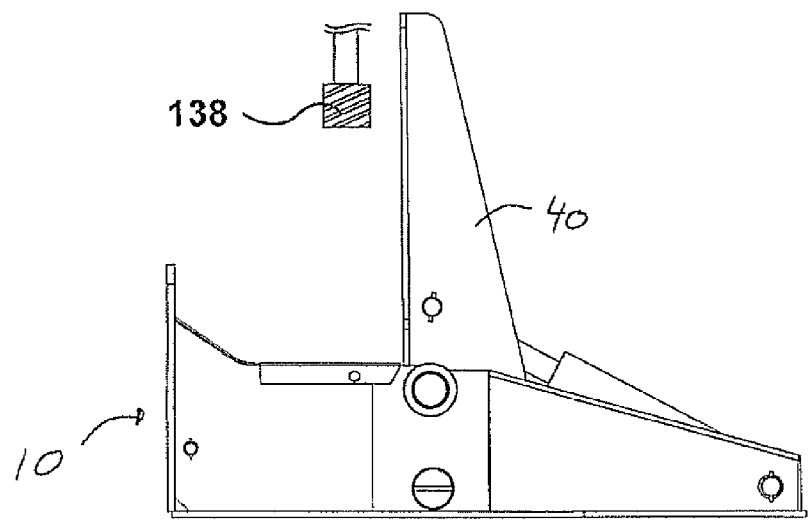
FIG. 8E shows the device in its upright position.

The lock cylinder 80 and actuator 124 are respectively configured such that the lock cylinder 80 may be rotated between a first, non-locking position as seen in FIGS. 3, 4 and 7, wherein cutaway regions 120 are substantially horizontal, and a locking position seen in FIG. 6, wherein the regions 120 are vertical and face rearwardly. Lock cylinder 80 is positioned to be adjacent to the central ribs 52 of the arm 40, such that these may be engaged with cylinder 80 to lock the arm 40. In the non-locking position, regions 120 of the cylinder 80 are configured to permit the curved lower segments 62 of ribs 52 to rotate freely past cylinder 80 without contacting same, as seen in FIG. 7. When the cylinder 80 is rotated such that cutaway regions 120 are vertical, the scalloped recesses 64 of segments 62 contact lock cylinder 80 (as seen in FIG. 6). The curvature of recesses 64 generally matches the exterior curvature of cylinder 80 to increase the contact area. The respective surfaces of recesses 64 and regions 120 thereby effectively form cooperating engagement surfaces, such that when out of engagement permit the arm 40 to rotate freely, but when brought into engagement via rotation of cylinder 80 abut each other to prevent rotation of arm 40, thereby retaining the arm in an upright position to contact and restrain the vehicle from moving away from the loading dock. The cylinder 80 and ribs 52 are configured to come into contact with each other when the arm 40 is at a selected upright position, which preferably is a vertical or substantially vertical position. When oriented in this fashion, arm 40 is prevented from further rotating in a forward direction (away from the loading dock) past this vertical position. In this upright position, the ICC bar 138 or other vehicle portion will be blocked by the retaining arm, preventing movement of the vehicle away from the loading dock.

It will be seen that various locking or other anti-rotation means to retain the arm in an upright position may be provided. For example, in one alternative, a separate locking mechanism as described herein is not provided, such that the anti-rotation function is performed by providing hydraulic cylinder 82 with sufficient actuating force to serve this function. The term "lock" as used herein is intended to broadly describe any suitable means which may be actuated to prevent rotation of arms 40 sufficiently to serve the function of preventing unwanted movement of a vehicle under normal conditions associated with operation of a loading dock.

Figure 9:
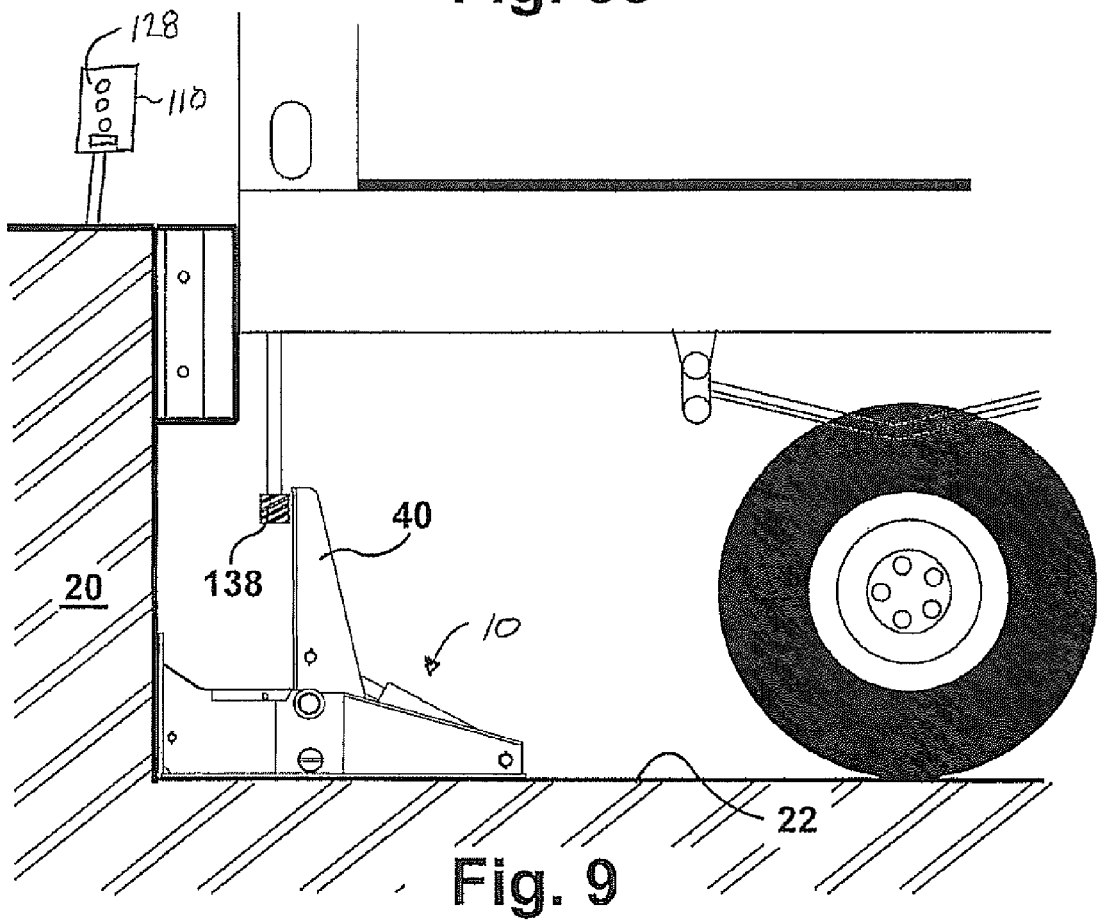
FIG. 9 is a schematic side elevational view, showing the device in its upright position, in the environment of a loading dock, and engaging a conventional tractor-trailer.

A system controller 110 is provided to control the operation of the system described herein. Controller 110 is shown schematically in FIG. 9. The controller may be integral with the restrain device 10, or it may be positioned remotely therefrom, as seen in FIG. 9, and communicate with the device by any suitable means. The controller is in operative communication with the hydraulic actuators 82 and 124 which control elevation of the arm 40 and actuation of the lock cylinder 80. The controller is also in operative communication with and responsive to the position sensor 100 and contact sensor 130, described below. For this purpose, "operative communication" includes any suitable and convenient means to effect communication between the various components, and may include wireless or wired electronic or electrical signal communications, as well as hydraulic communications between the controller and the hydraulic cylinders. Alternatively, actuation of the respective mechanical components may rely entirely on electro-mechanical means, thereby permitting entirely electrical signal communications.

The controller includes or is in operative communication with a user interface 128, which permits the user to actuate the arm 40 and lock cylinder 80. The user interface also provides visual or other signals to the users of the system so as to indicate the rotational position of the arm and the operative status of the system, namely whether or not a vehicle is restrained by the system. A convenient signalling means comprises display units comprising red and green lights, with a first display unit being visible to the dock operator and second display unit being located for convenient viewing by the vehicle operator. The first unit displays a red light to signal to the dock operator that the vehicle is not restrained and is able to move away, while a green light signals to the operator that the vehicle is restrained. The second unit displays a red light to signal to the vehicle driver that the vehicle is restrained, and the driver should not attempt to move the vehicle, while a green light signals to the driver that his vehicle is unrestrained, and he may depart from the loading dock.

The system includes a contact sensor 130 so as to transmit a signal to the controller indicative of contact between the vehicle and the vehicle. The contact sensor comprises any suitable means to detect contact between the arm and a relatively unyielding object indicative of contact with a large vehicle. The contact sensor may comprise a component located on the surface of arm 40. In one version, the contact sensor is incorporated into the controller 110 and constitutes a component thereof which is responsive to the position sensor, wherein the controller is configured to determine when the position sensor detects an absence of movement following an elevation sequence. Since the arm will stop its rotationary movement when it contacts an unyielding object, such an absence of movement is indicative of contact with a vehicle or other relatively unyielding object. The controller is responsive to the contact sensor and the position sensor and can then synthesise information received from these two sources to determine the location of the arm on contact with the vehicle, with this information being synthesized with the predetermined range information to carry out the appropriate steps for operation of the system, as described below. Alternative contact sensing means may be provided, including a contact or proximity sensor (not shown) mounted to the arm 40 to detect contact or proximity between the sensor and the vehicle.

An operating sequence, illustrated in FIGS. 8a-e, comprises the following steps:

(1) The vehicle backs into the loading dock while the arm 40 is in its lowered position, permitting the ICC bar 138 of the vehicle to pass over the restraint 10 without contact.

(2) The vehicle halts in what the driver believes to be its proper position, and the dock operator actuates arm 40 to rotate towards its elevated position.

(3) As arm 40 rotates, position sensor 100 signals to the controller the position of arm 40 on a continuous basis. Preferably, the response time of position sensor 100 is in the millisecond range for fast response by the controller.

(4) If the vehicle is located too far away from the dock at this time, arm 40 will contact the forward side (facing the front of the vehicle) of the vehicle ICC bar 138 (or other portion) of the vehicle prematurely, wherein arm 40 is disposed at an angle of less than 90 degrees from the horizontal, which is outside of the predetermined vehicle engagement position. It will be seen that the predetermined position may be selected which is other than 90 degrees. Since arm actuator 82 is set to supply a relatively low pressure to arm 40, this initial contact with the vehicle will cause the arm to stop further movement. The position sensor 100 will signal the controller that movement of arm 40 has stopped and will also communicate the angular position of the arm. Since this position is less than vertical, the controller will then signal to the arm actuator 82 to lower the arm back to its rest position. The user interface of the controller will signal to the dock operator that the vehicle is in an incorrect position too far away from the dock, and that the vehicle is unrestrained as a result.

(5) When the vehicle is parked in a suitable position (as seen in FIG. 9), the operator will actuate the system to elevate arm 40 (for a second time, if the vehicle was previously located in an unsuitable position) such that arm 40 rotates to its fully upright position. This position may constitute a selected range of angular dispositions, from the vertical to slightly past the vertical. If the vehicle is parked in a suitable position, the arm will then contact the forward side of ICC bar 138. If this point of contact is within the predetermined range but past the vertical, the arm will return to the upright position, depower actuator 82 and engage the lock. However, if the vehicle is located past the ideal loading location, the arm will contact the vehicle only upon rotating past the selected upright position range, or not at all, in which case arm 40 will return to the lowered position and a signal is initiated as set out in step 7 below.

(6) Upon depowering of arm 40, the lock is actuated to prevent any rotational movement of the arm, so as to restrain the vehicle from inadvertently moving away from the loading dock. In the case of the lock mechanism described herein, the lock actuator 124 rotates the lock cylinder 80 into the locking position. If arm 40 has rotated past the vertical, it will be slightly retracted until the respective surfaces 64 and 120 engage each other, thereby locking the arm in a substantially vertical position. The user interface 140 then signals to the dock operator that the vehicle has been restrained, and optionally also signals to the vehicle operator the same information. FIG. 9 illustrates the system in this position, wherein arm 40 is in the upright locked position and engages ICC bar 138.

(7) If the vehicle is parked at a position which is too close to the loading dock, the arm 40 will continue to rotate to the end of the selected range without contacting the vehicle. Once this occurs, the controller will cause the arm to retract back to its initial, horizontal position without engaging the lock. The user interface will signal to the dock operator that the vehicle is unengaged and is positioned too close to the loading dock. Optionally, the vehicle operator is also signalled the same information. This provides the vehicle operator with the opportunity to slightly pull the vehicle away from the loading dock to better position the vehicle for engagement by the restraint.

It will be seen by those skilled in the art that although the present invention has been described by way of detailed embodiments thereof, the present invention is not limited to the embodiments or elements described in detail herein. The invention includes variations and departures from the elements described herein, and equivalent elements, features and aspects thereto. The full scope of the present invention is defined by the specification as a whole, including the claims, and further including functional, mechanical and structural equivalents to the elements described herein.

What is claimed is:

1. A vehicle restraint system for preventing forward movement of a vehicle away from a loading dock, comprising:
   a. a base;
   b. an arm rotatably mounted to the base for rotating between a lowered position out of contact with the vehicle, an upright position wherein the arm may contact the vehicle to restrain the vehicle in a selected location relative to the loading dock suitable for loading or unloading and a range of partially elevated positions intermediate between the lowered and elevated positions wherein the arm contacts the vehicle when not in the selected position;
   c. an arm rotator for rotating the arm between the lowered and upright positions;
   d. a position sensor to detect the angular position of the arm throughout the range of motion of said arm, and within a continuous arcuate range for determining the position of the vehicle relative to the dock upon contact with said arm;
   e. a lock for locking the arm in an upright position wherein the vehicle may be blocked by said arm;
   f. a lock actuator for actuating the lock; and
   g. a controller responsive to the position sensor for: a) determining rotational movement of the arm and the rotational position of the arm within said continuous arcuate range, b) determining if rotation of the arm is prevented by contact between the arm and the vehicle, and c) determining from the rotational position of the arm when contacting the vehicle whether the vehicle is: i) located ahead of the selected location, ii) located behind the selected location or iii) located at the selected location to permit locking the arm in the upright position only when the vehicle is located at the selected location.

2. A system as defined in claim 1 wherein said controller is configured for operation of said system according to the following sequence:
   a. rotate said arm from said lowered position towards said upright position;
   b. upon detection of contact with said vehicle at a rotational position of said arm in the partially elevated position, rotate said arm back to said lowered position; and
   c. upon detection by said contact sensor of contact with said vehicle when said arm is in said upright position indicative of said vehicle being in the selected location, actuate said lock via said lock actuator to retain the arm in the upright position.

3. A system as defined in claim 2 wherein said upright position of said arm comprises a selected range of angular positions of said arm, and said controller is configured to return said arm to a substantially vertical position if the arm contacts a vehicle when within said selected range but past the vertical position, and thereupon locking said arm in said vertical position.

4. A system as defined in claim 1 wherein said arm is configured to contact the ICC bar of a truck trailer.

5. A system as defined in claim 1 wherein said position sensor comprises an angle detector mounted to said arm, configured to detect the angle of disposition of said arm and to transmit a signal to said controller indicative of said angle.

6. A system as defined in claim 1 wherein said controller is responsive to said position sensor to detect cessation of movement of said arm caused by contact between said arm and the vehicle.

7. A system as defined in claim 1 wherein said upright position of said arm comprises a selected range of angular positions.

8. The system of claim 1 wherein the arm comprises a contact surface for engaging the lock and the lock comprises a lock member rotatable between a non-locking position wherein the arm is out of engagement with the lock member and a locking position wherein the arm is in the upright position and the lock member engages the contact surface to prevent rotation of the arm.

9. The system of claim 8 wherein the lock member comprises a cylindrical surface having a groove therein and the arm comprises a curved surface configured to travel within the groove when out of engagement therewith.

10. The system of claim 9 wherein the contact surface of the arm comprises a recess configured to engage the cylindrical surface of the lock member to lock the arm in the upright position when in the locking position whereby the lock member can be rotated to selectively engage or disengage the contact surface.

11. The system of claim 10 wherein the curved surface of the arm is adjacent to the recess in the arm.

12. The system of claim 8 wherein said lock member is actuated by a lock actuator responsive to said controller, wherein said controller actuates the lock to lock said arm in the upright position upon depowering of the arm rotator.

13. The system of claim 1 further comprising a contact sensor associated with said arm to detect contact between the arm and the vehicle, said controller being responsive to said contact sensor to determine the rotational position of the arm when in contact with the vehicle.

14. A method to restrain a vehicle comprising the steps of:
   a. providing a vehicle restraint system for preventing forward movement of a vehicle away from a loading dock, said system comprising a rotatable arm for restraining a vehicle when in contact therewith,
   b. rotating said arm from a lowered position out of contact with the vehicle towards an upright position for restraining the vehicle when the vehicle is in a selected location relative to the loading dock;
   c. determining the position of the vehicle relative to the dock by detecting the angular position of said arm throughout the range of motion of said arm upon contact between said arm and the vehicle within a continuous range of angular positions of said arm;
   d. if contact is detected between said arm and said vehicle at an angular position of said arm indicative of the vehicle being outside the selected location, transmitting a first signal; and
   e. if contact is detected between said arm and said vehicle at an angular position of said arm at said upright position, transmitting a second signal for locking said arm against rotational movement to block movement of said vehicle.

15. A method as claimed in claim 14 wherein said step d further comprises rotating of said arm back to said lowered position following contact with the vehicle.

16. A method as defined in claim 14 wherein said upright position of said arm comprises a selected range of angular positions.

17. A method as defined in claim 16 wherein if contact between said arm and said vehicle is detected when the rotational position of said arm is located within said selected range but past a substantially vertical position, said arm is rotated back to the substantially vertical position locked in said substantially vertical position.

18. A method as defined in claim 14 wherein said step of detecting the angular position of said arm comprises use of an angle detector mounted to said arm.

19. A method as defined in claim 14 wherein said step of detecting contact between said arm and said vehicle comprises determining cessation of rotational movement of said arm or resistance to rotational movement indicative of contact with a vehicle.

20. A method as defined in claim 19 wherein said step of detecting contact comprises detecting the angular position of said arm on a real time basis to detect cessation of rotational movement of said arm when in an elevated position.

* * * * *